9521X

E. Nott,

Steam-Boiler Furnace.

Patented Mar. 19, 1836.

N. PETERS, PHOTO-LITHOGRAPHER. WASHINGTON. D. C.

9521 X   Eliphalet Nott   3-19-1836

Letters Patent.

214.

The Schedule referred to in these Letters Patent and making part of the same, containing a description in the words of the said Eliphalet Nott, himself of his improvement "In Furnaces for the generation of steam on board of steam boats; applicable elsewhere and to other purposes.

---

Specification of improvements made in furnaces for the generation of steam on board of steam boats; applicable elsewhere: and to other furnaces.

Figure 4:
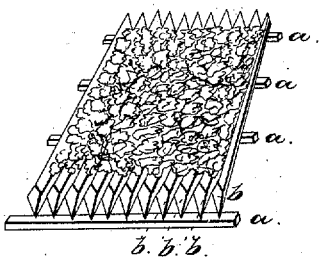
Figure 5:
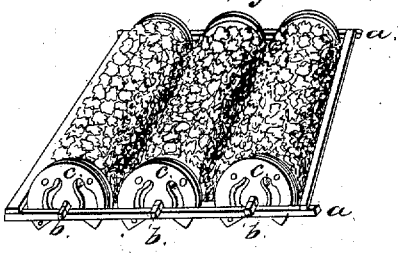
Figure 1:
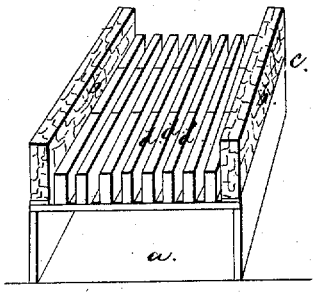
Figure 2:
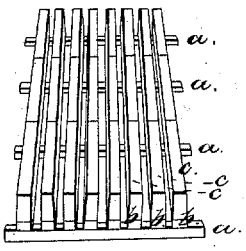
Figure 3:
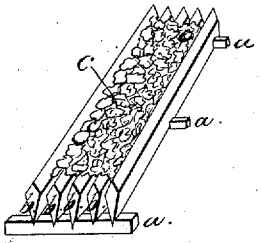

Whereas brick or other argillaceous material if made use of in furnaces to which air is passed through a grating. is liable to flux by the mere action of anthracite coal. therefore an improvement has been introduced into such furnaces for the use of such coal on board of steam boats; which improvement, consists in coating such material whether imployed for grating or side walls with some other material (as silex) that will not flux by the mere action of the fuel in use; the same to be put on in the form of grout or mortar as similar coatings are put on to melting furnaces to prevent the action of the contents on the crust thereof— And whereas metallic grate bars when employed for sustaining incumbent fuel, readily oxidize especially if anthracite coal be in use. therefore an improvement has been introduced which consists in substituting a granulated floor. in place of said bars; that is a floor of material that will not flux and that is disposed in separate masses, which may be effected. by adjusting in the bottom of the furnace stretches of stone or other fit materi al 22. 9521X 3-19-1836 materials; with intervening fissures for the passage of air and the poker; and supporting the same in place by combining therewith a requisite number of rods or other supports running crosswise as exhibited fig 1. or running lengthwise as exhibited fig 2– or by adjusting as aforesaid, an adequate number of globes prisms or irregular figures of stone or other fit material in the form of a pavement, and supporting the same in place by combining therewith an adequate number of separate plane grate bars as exhibited fig 3. or of plane grate bars integrated by cross rods as exhibited Fig 4. or of curvilinear grate bars cast together and sustained by gudgeons or cast separately integrated by cross rods, and sustained by a full length axis the same being constructed and worked after the manner of the rotary grates in use in Notts patent stoves, as exhibited fig 5; or supported in any other manner preferred.– It is to be understood that when stretchers and rods are combined as aforesaid. the former may be kept in place upon the latter by pins projected upward, or tenons downward. or by clamps or in any other manner preferred.– For further information reference may be had to the drawings and explanations connected herewith.—

Claim.– I claim as my invention, especially in furnaces for the use of anthracite coal on board of steam boats, the improvement contemplated by each and all the several combinations, above set forth together with the uses to which the same may hereafter be applied elsewhere and in other furnaces Exd. Witnesses
MGE S. W. Jones
Cornelius Duane Eliphalet Nott 542 Ward

1522

(Granted March 19.1836)